United States Patent
Simon et al.

(10) Patent No.: US 8,953,754 B1
(45) Date of Patent: Feb. 10, 2015

(54) PRE-AUTHENTICATION SYSTEM AND METHOD FOR OUTGOING COMMUNICATION

(75) Inventors: Charlie Aziz Simon, Portland, OR (US); Jacob Mine Mou, Portland, OR (US)

(73) Assignee: Wells Fargo Bank, N.A., San Francisco, CA (US)

( * ) Notice: Subject to any disclaimer, the term of this patent is extended or adjusted under 35 U.S.C. 154(b) by 673 days.

(21) Appl. No.: 12/764,806

(22) Filed: Apr. 21, 2010

Related U.S. Application Data

(60) Provisional application No. 61/172,675, filed on Apr. 24, 2009.

(51) Int. Cl.
*H04M 1/64* (2006.01)

(52) U.S. Cl.
USPC .......................................... 379/88.04; 705/39

(58) Field of Classification Search
CPC ........... H04M 3/385; H04M 2201/40–2201/41
USPC ................... 379/88.01, 88.04, 265.02, 88.02; 704/270; 705/44, 39
See application file for complete search history.

(56) References Cited

U.S. PATENT DOCUMENTS

| | | | |
|---|---|---|---|
| 4,797,911 A | 1/1989 | Szlam et al. | |
| 4,894,857 A | 1/1990 | Szlam et al. | |
| 5,371,787 A | 12/1994 | Hamilton | |
| 5,404,400 A | 4/1995 | Hamilton | |
| 5,430,792 A | 7/1995 | Jesurum et al. | |
| 5,581,602 A | 12/1996 | Szlam et al. | |
| 5,724,420 A | 3/1998 | Torgrim | |
| 5,828,731 A * | 10/1998 | Szlam et al. | 379/88.16 |
| 6,208,970 B1 * | 3/2001 | Ramanan | 704/270 |
| 6,470,077 B1 | 10/2002 | Chan | |
| 6,587,557 B1 | 7/2003 | Smith | |
| 6,771,746 B2 | 8/2004 | Shambaugh et al. | |
| 6,925,166 B1 * | 8/2005 | Chan | 379/265.02 |
| 7,184,521 B2 | 2/2007 | Sikora et al. | |
| 2003/0043990 A1 | 3/2003 | Gutta et al. | |
| 2003/0202649 A1 | 10/2003 | Haug et al. | |
| 2003/0216996 A1 * | 11/2003 | Cummings et al. | 705/39 |
| 2004/0101112 A1 * | 5/2004 | Kuo | 379/88.01 |
| 2005/0190908 A1 | 9/2005 | Haug et al. | |
| 2005/0207558 A1 | 9/2005 | Shimpi et al. | |
| 2005/0232410 A1 | 10/2005 | Gonzalez | |
| 2006/0056600 A1 * | 3/2006 | Merrow et al. | 379/88.02 |

(Continued)

FOREIGN PATENT DOCUMENTS

| WO | WO-2007/065193 | | 6/2007 |
|---|---|---|---|
| WO | WO 2007065193 A1 | * | 6/2007 |

OTHER PUBLICATIONS

Castel, Inc.; Castel Connects, Intelligent Message Delivery Documentation Release 3.00; 2007-2008 Castel, Inc.; Beverly, MA.

(Continued)

*Primary Examiner* — Fan Tsang
*Assistant Examiner* — Van D Huynh
(74) *Attorney, Agent, or Firm* — Foley & Lardner LLP

(57) ABSTRACT

An automated calling system authenticates and subsequently communicates via a telephone network with a person such as a current or prospective customer. The communication may be in regards to an account having an adverse account status (e.g. a payment delinquency, an overdrawn checking account, being over the credit limit on a credit card, excessive transactions on one account, suspicious or fraudulent transactions on an account, and so on).

19 Claims, 6 Drawing Sheets

(56) References Cited

U.S. PATENT DOCUMENTS

2006/0256945 A1    11/2006   Noble, Jr.
2009/0327131 A1*   12/2009   Beenau et al. .................. 705/44

OTHER PUBLICATIONS

Castel, Inc.; Castel Connects, Operations and Configuration Guide V3.00; 2008 Castel, Inc.; Beverly, MA.

Castel, Inc.; Castel Connects, Services Guide Release 3.0; 2007-2008 Castel, Inc.; Beverly, MA.

Castel, Inc.; Castel Connects, Using the Campaign Generator V3.0; 2008 Castel, Inc.; Beverly, MA.

Castel, Inc.; Castel Connects; http://www.castel.com/solutions_connects.html; 2010 Castel, Inc., Beverly, MA.

Castel, Inc.; Intelligent Message Delivery; http://www.castel.com/solutions_imd.html; 2010 Castel, Inc., Beverly, MA.

* cited by examiner

PRE-AUTHENTICATION SYSTEM AND METHOD FOR OUTGOING COMMUNICATION

CROSS-REFERENCE TO RELATED PATENT APPLICATIONS

This application claims priority from Provisional Application U.S. Application 61/172,675, filed Apr. 24, 2009, incorporated herein by reference in its entirety.

BACKGROUND OF THE INVENTION

Automatic calling telephone systems have been used, for example, by businesses to communicate with prospective and current customers. Current systems may include an automatic dialer that may automatically dial telephone numbers. Once a call connects, the system may play verbal messages or transmit digital data to the called party or an answering machine. Various other technologies, including voice modems or telephony boards, may be used by the calling system to contact many phone numbers simultaneously.

When a call is answered, these automated calling system may determine whether the call was answered by an answering machine or a live human voice. If the call is answered by an answering machine, the calling system may leave a message. If the call is answered by a person, the calling system may route the call to a customer service representative, and the customer service representative may proceed to interact with the person that answered the call. Often times, even when the call is answered by a person, the person is someone other than the customer that was intended to be reached. Hence, the customer service representative queries the person that answered the call to determine whether that person is the customer. If the person that answered the call is the customer, then the call may proceed as intended. Otherwise, a message may be left requesting a return phone call from the customer.

SUMMARY OF THE INVENTION

Example embodiments of the present invention relate to automatic systems to initially authenticate and subsequently communicate with a person such as a current or prospective customer. Examples of the present inventions are related to a banking institution communicating with an account holder that has accounts having an adverse account status. An account may have an adverse account status for a variety of reasons. Examples of an adverse account status include a payment delinquency, an overdrawn checking account, being over the credit limit on a credit card, excessive transactions on one account, suspicious or fraudulent transactions on an account, and so on.

Example embodiments of the present invention relate to a method and system for transferring automatically dialed calls to a live agent. The automated calling logic may determine if the response to an outgoing call is of a human voice, and if the detected voice is that of the customer that holds an account that has an adverse account status. Upon authenticating the customer, the system may transfer the call to a live agent for further collections processing.

DETAILED DESCRIPTION OF EXAMPLE EMBODIMENTS

Figure 1:
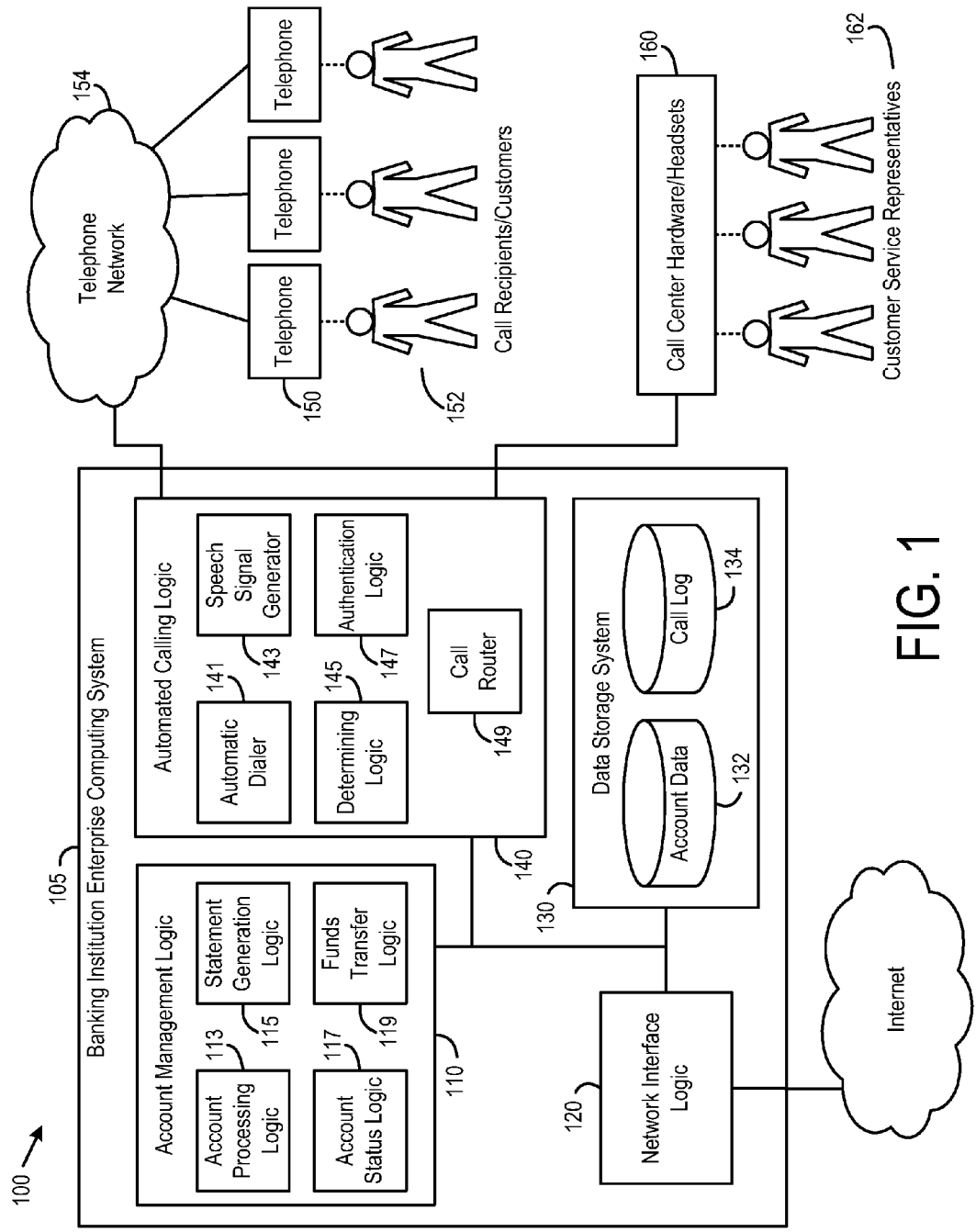
FIG. 1 is a schematic diagram of a data processing system according to an embodiment of the present invention.

Referring to FIG. 1, a system 100 according to an example embodiment is shown. The data processing system 100 may include an enterprise computing system 105 that may include, among other systems, account management logic 110, network interface logic 120, data storage system 130, and automated calling logic 140. The enterprise computing system 105 may include server-based computing systems, for example, comprising one or more networked computer servers that are programmed to perform the operations described herein.

In an example embodiment, the enterprise computer system 105 may be provided by a financial institution, such as a bank, and the users may be the customers of the financial institution that access the system 105 through tellers at retail bank branches, through the Internet, or in another manner. The customers may, for example, access system 105 through an on-line banking area of a website of the bank. As another example, computing system 105 may be associated with other types of companies that maintain customer accounts, such as utility companies, insurance companies, retailers, and so on. As another example, computing system 105 may be associated with vendors to whom billing, collection, or call center operations are outsourced by other companies.

In the example where system 105 is provided by a financial institution, account management logic 110 may further include account processing logic 113, statement generation logic 115, account status logic 117, and funds transfer logic 119. Such logic may, in practice, be implemented in a machine (e.g., one or more computer servers) comprising machine-readable media having instructions stored therein which are executed by the machine to perform the operations described herein. The account processing logic 113 may perform account processing to process transactions in connection with the account(s) of the account holder, such as account debits and credits to checking and savings accounts, credits and debits to home mortgage and home equity accounts, credits and debits to student loan accounts, and so on. For example, in the context of checking accounts, the transactions may also include electronic bill payment transactions in which monies from the checking account of the user are used to pay bills received by the user. The account processing logic 113 may retrieve and store information in the data storage system 130 relating to the account data 132. Statement generation logic 115 may generate statements for a customer user relating to the customer's account(s). Account status logic 117 may generate codes that indicate account status, such as, current, delinquent, late, over the limit, in default or the like. The funds transfer logic 119 may be used to transfer funds between accounts of a single account holder or between an account of an account holder and a third party (which may or may not be another account holder). The fund transfer logic 119 may receive a fund transfer request from a customer through a teller, through the on-line banking area of the website, or through other systems in the banking institution computer system 105, such as the automated calling logic 140. In response to a fund transfer request, the fund transfer logic 119 may transfer funds from an account that is not in default to an account that is in default. The fund transfer logic 14 may perform the transfer of funds by updating the account data 132.

Network interface logic 120 may be used to connect the computing system 105 to the Internet to permit customers to access computing system 105 through an on-line banking area of a website of the bank. For example, in the context of desktop/laptop computers, network interface logic 120 may comprise one or more web servers that provide a graphical user interface (e.g., a series of dynamically-generated web pages) for users that access system 105 through the web. The graphical user interface may be used to prompt the user to provide login information, passwords and other authentication information, to provide the user with account information, and so on. Network interface logic 120 may also comprise other logic that is configured to provide an interface for other types of devices such mobile devices that includes cell phones, smart phones, fax machines, ATMs, and server-based computing systems.

The data storage system 130 stores account data 132 and call log 134. The call log 134 is used by the automated calling logic 140 to store the status of the calls made to an intended customer. In particular, the call log 134 may retain information regarding whether a live human voice was reached in the last phone call or whether the live voice indicated that the intended customer may not be located at the phone number of record at the banking institution or other status events to be discussed in greater detail below.

Automated calling logic 140 may be used to call customers 152 through telephone network 154 (e.g., comprising one or more telephone utility connections, cellular network connections, VOIP connections, and so on). The automated calling logic 140 connects the customers 152 with the customer service representative 162 after pre-authenticating the customers 152 as discussed in greater detail below in FIGS. 2-5*b*. The customer service representatives 162 may communicate with the customers 152 using headsets and other call center hardware (e.g., computer terminals displaying customer account information) 160.

The automated calling logic 140 may receive data that includes a list of customer information, for example, a list of customers having accounts with an adverse account status, the nature of the condition, and so on. As another example, the automated calling logic 140 and the account management logic 110 may have access to a common data storage area that is dynamically updated by the account management logic 110 and that comprises a list of accounts having an adverse account status. Examples of an adverse account status include a payment delinquency, an overdrawn checking account, being over the credit limit on a credit card, excessive transactions on one account, suspicious or fraudulent transactions on an account, and so on. The adverse account status may relate to an account that the customer has with the financial institution that operates the enterprise computing system 105. As another example, the adverse account status may relate to an account that the customer has with a third party. For example, if the enterprise computing system 105 includes electronic bill pay and bill presentment logic, the customer may have configured their account to receive bills from third parties through the enterprise computing system 105. In such an instance, the adverse account status may relate to an account the customer has with one of such third parties. The recipient/customer information that is received by the automated calling logic 140 may include, among other information, the customer phone number, name, address, zip code, customer personal identification number or other identification tokens, secret questions and answers for authentication, account numbers, dollar amount the account is in default, the type of default, how long the account has been in default, other account with banking institution or the like.

The automated calling logic 140 may include an automatic dialer 141, a speech signal generator 143, determining logic 145, authentication logic 147 and a call router 149. The automatic dialer 141 may use computer software, specialized hardware, modem, voice over internet protocol (VOIP), telephony boards or any combination of the above technology to place the phone calls to the recipient/customer through a telephone network. The automatic dialer 141 may, for example, be implemented using a commercially available, programmable/customizable autodialer system and programming the system to perform the operations described herein.

The speech signal generator 143 generates messages that are played during phone calls to recipients/customers. Examples of such messages are described below. Speech signal generator 143 may, for example, comprise a text-to-speech converter to generate messages based on stored text. Various different types of audio formats and compressions may be used for the speech signal, such as but not limited to, vox, way, mp3, ogg, gsm, dct, flac, au, aiff, raw, wma, aac, ra, ram, dss, msv, dvf, and so on.

The determining logic 145 determines whether a call was answered by an answering machine or a live voice. To this end, the determining logic 145 may comprise a signal processor that analyzes the received signal. For example, the determining logic 145 may analyze the received signal to listen for a constant frequency "beep" that is played by the answering machine prior to playing a recorded greeting.

The authentication logic 147 authenticates recipients of telephone calls as being the intended customer. As previously indicated, when a call is placed to a customer, the person that happens to answer the telephone call, i.e., the recipient, may or may not be the customer having the account with the adverse account status. For example, the recipient may be a family-member, relative, friend, or other third party. The authentication logic 147 authenticates the recipient as being the customer. Various levels of authentication may be used depending on the nature of the call and the business to be conducted. In FIGS. 2-5*b*, for purposes of example, it is assumed that the call is made in connection with a delinquent account. In such an example, the authentication logic 147 may authenticate the customer by detecting whether the recipient indicates he or she is the customer in response to a prompt provided by the speech signal generator 143 (e.g., "If this is (customer name), press 1."). For other transactions (e.g., involving account transfers), a higher level of authentication may be desired. For example, the customer may be prompted to enter a pin number or other previously-collected secret information, e.g., a correct answer to a security question. For example, the customer may have been previously been asked: "What would be your first choice as a vacation destination: (1) (destination #1), (2) (destination #2), (3) (destination #3), or (4) (destination #4).)." During the authentication process, the question and the list of choices may be repeated to the user, and the user may be authenticated based on the user's ability to provide the correct answer to the question (e.g., by pressing the correct number 1-4 on the telephone keypad). Multiple such security questions may be posed, e.g., depending on the level of security that is desired, or if the user fails to answer a first-posed question correctly. As another example, the authentication logic 147 may use voice recognition technology to identify the whether the voice that has responded to the phone call is or is not the voice of the intended recipient/customer 152. For example, the data storage system 130 may store an earlier voice sample from the intended customer as part of the account data 132. The authentication logic 147 may then authenticate the recipient by comparing the voice patterns from the voice signal received from the telephone 150 with the stored voice sample to determine whether there is a sufficiently high probability of a match.

The call router 149 routes calls to customer service representatives 162 after a recipient of a call is authenticated. The call router 149 also transmits the account data regarding the authenticated call recipients/customer's accounts to the customer service representatives 162. The transmittal may be done such that, when the call is connected to the customer service representatives 162, the account data is displayed to the customer service representative receiving the call. The customer's account information may then be displayed on computer terminals 160 to the customer service representative 162.

The automated calling logic 140 facilitates pre-authentication of the customer prior to a customer service representatives 162 receiving the call, thereby allowing for the time of the customer service representatives 162 to be used only in situations when the intended recipients/customers 152 are on the telephone 150. Customer service representatives 162 do not spend time determining whether they have reached the intended recipient/customer and do not spend time speaking with persons other than the intended recipient/customer. Thus, in situations when a customer 152 has an account with an adverse account status, the banking institution computer system 105 may pre-authenticate the intended customer and connect that customer to a customer service representatives 162. The automated calling logic 140 also facilitates pre-authentication of the customer prior to permitting the customer to engage in other account-related activities such as account transfers and payments.

Figure 2:
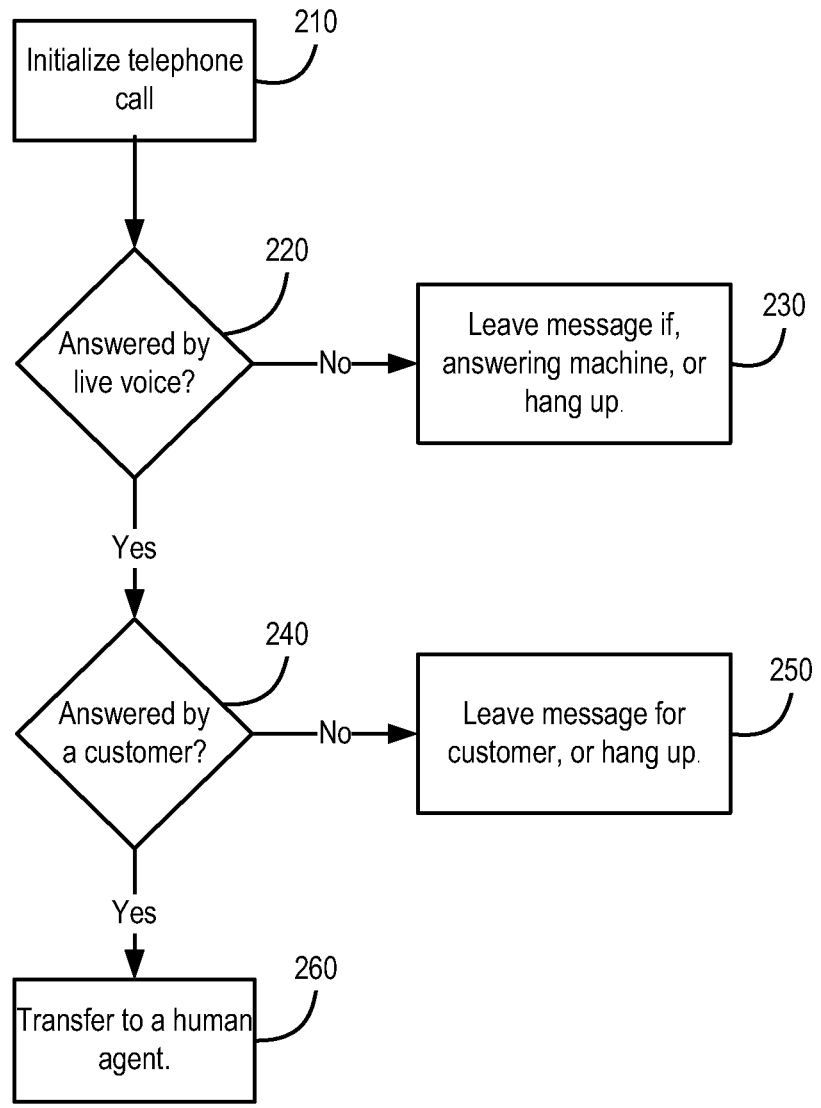
FIG. 2 is an example process that may be implemented using the system shown in FIG. 1.

Referring now to FIG. 2, FIG. 2 is an example process that may be implemented using the system shown in FIG. 1 to initiate and transfer the call to a human agent. After receiving the recipient/customer information, the automated calling logic 140 may dial various phone numbers using the automatic dialer 141. At step 210, the automatic dialer 141 may initialize a telephone call to a particular customer using the telephone network 154. After the phone number is dialed and the phone call is connected, the speech signal generator 143 sends a speech signal by playing an audio file to the recipient of the phone call through the telephone network 154. The generated speech signal may recite a variety of different messages depending on the recipient/customer data received from the data storage system 130.

At step 220, the determining logic 145 may determine whether the call was answered by an answering machine or a live voice. If the telephone call was not answered by a live voice then, at step 230, the speech signal generator 143 may leave a voice a message for an answering machine or simply hang up. Step 230 is described in greater detail in connection with FIG. 3.

If the determining logic 145 determines that the sound on the recipient's end is a live human voice, then in response the authentication logic 147 may begin authenticating the recipient as being the intended customer. In particular, the authentication logic 147 may use the speech signal generator 143 to ask whether the person who answered the call is the customer associated with the account having the adverse account status. For example, the speech signal generator 143 may generate a message that recites: "This is an important message from (entity name) for (customer name). If this is (customer name), please press (a specified number)." If the person on the call does not press the specified number, then, at step 250, the speech signal generator 143 may play a message for the person on the phone, such as the following message: "This is an important message from (entity name) for (customer name). Please inform (customer name) to contact us toll-free at 1-800-555-555 at their earliest convenience." However, if the person on the telephone call pressed the specified number then, at step 260, the telephone call may be transferred to a human agent 162. In an example embodiment, the telephone call may be transferred using call router 149 to one of the customer service representatives 162.

Figure 3:
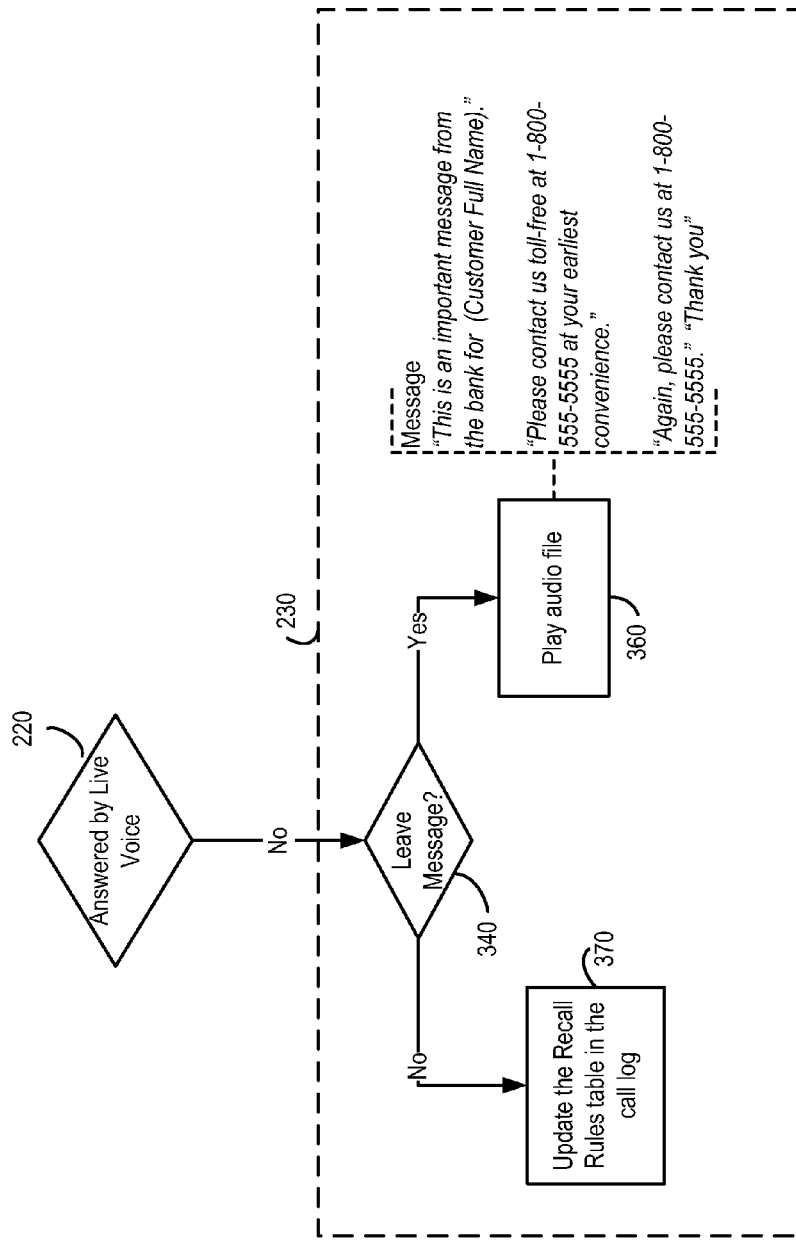
FIG. 3 is another example process that may be implemented using the system shown in FIG. 1.

Referring now to FIG. 3, FIG. 3 shows aspects of step 230 of FIG. 2 in greater detail according to an example embodiment. In FIG. 3, if the call is not answered by a live voice, then at step 340 the automated calling logic 140 determines whether to leave a message or simply update the call log 134. In particular, if a decision is made to leave a message at the 340, then at step 360 the speech signal generator 143 may for example play a message that states: "This is an important message from (entity name) for (customer name). Please contact us toll-free at 1-800-555-555 at your earliest convenience. Again, please contact us at 1-800-555-5555. Thank you." If, however, a message is not left, then the automated calling logic 140 may update the call table in the call log 134 at step 370. The call table may be updated to keep a record that a call was made and a live voice did not answer the phone and a message was not left.

Figure 4:
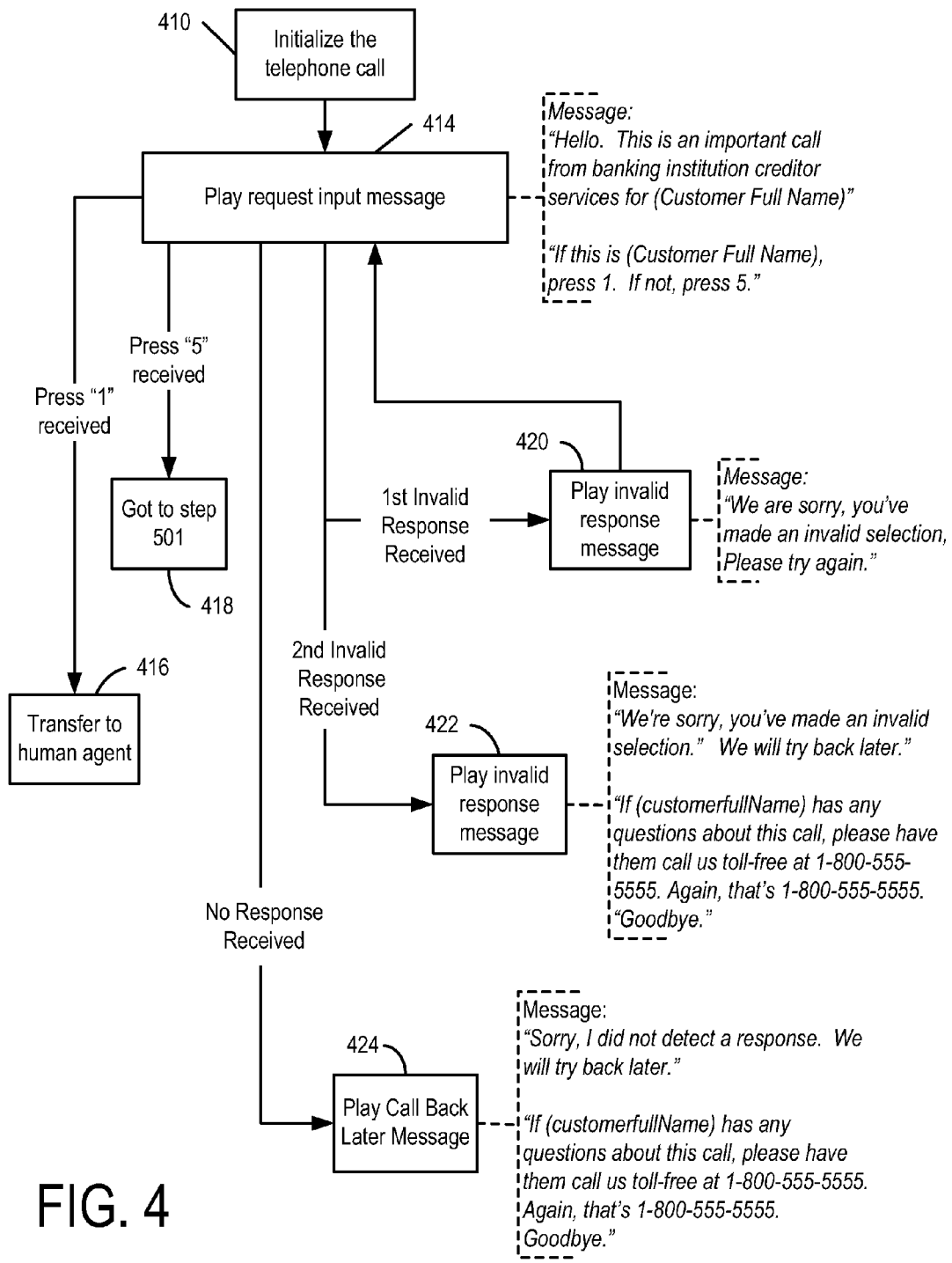
FIG. 4 is an example process that may be implemented using the system shown in FIG. 1 to initialize a telephone call and receive input.

Referring to FIG. 4, a more detailed example process that may be implemented using the system 105 shown in FIG. 1 to initialize a telephone call and receive input is shown. In particular, at step 410, a telephone call may be initialized by the automatic dialer 141. If the telephone call is answered, then at step 414 speech signal generator 143 may play a message that recites: "Hello. This is an important call from banking institution credit services for (customer name). If this is (customer name) press 1. If this is not (customer full name), then press 5." For example, if the person on the telephone call presses the number 1 key, and thereby, identifies themselves as the intended customer, then at step 416 the telephone call is transferred to a human agent using the call router 149. However, if the user presses "5," then at step 418 the process in FIG. 5 at step 501 (described in greater detail below) is initiated.

However, if the person on the phone does not enter a response or the determining logic 122 does not detect a response, then at step 424 the speech signal generator 143 may play a call back later message. For example, such a message may state: "Sorry, I did not detect a response. We will try back later. If (customer full name) has any questions about this call, please have them call us toll-free at 1-800-555-5555. Goodbye."

If the person on the phone enters an invalid response, then after receiving the first invalid response, the speech signal generator 143 plays a first invalid response message at step 420. Such a message may recite: "We are sorry, you've made an invalid selection. Please try again." After step 420, the speech generator plays the original message (step 414) again for the person on the phone. If the person on the phone thereafter enters a second invalid response, then at step 422 a second invalid response message is played. Such a message may recite: "We're sorry, you've made an invalid selection. We will try back later. If (customer full name) has any questions about this call, please have them call us toll-free at 1-800-555-5555. Again, that's 1-800-555-5555. Goodbye."

Figure 5A:
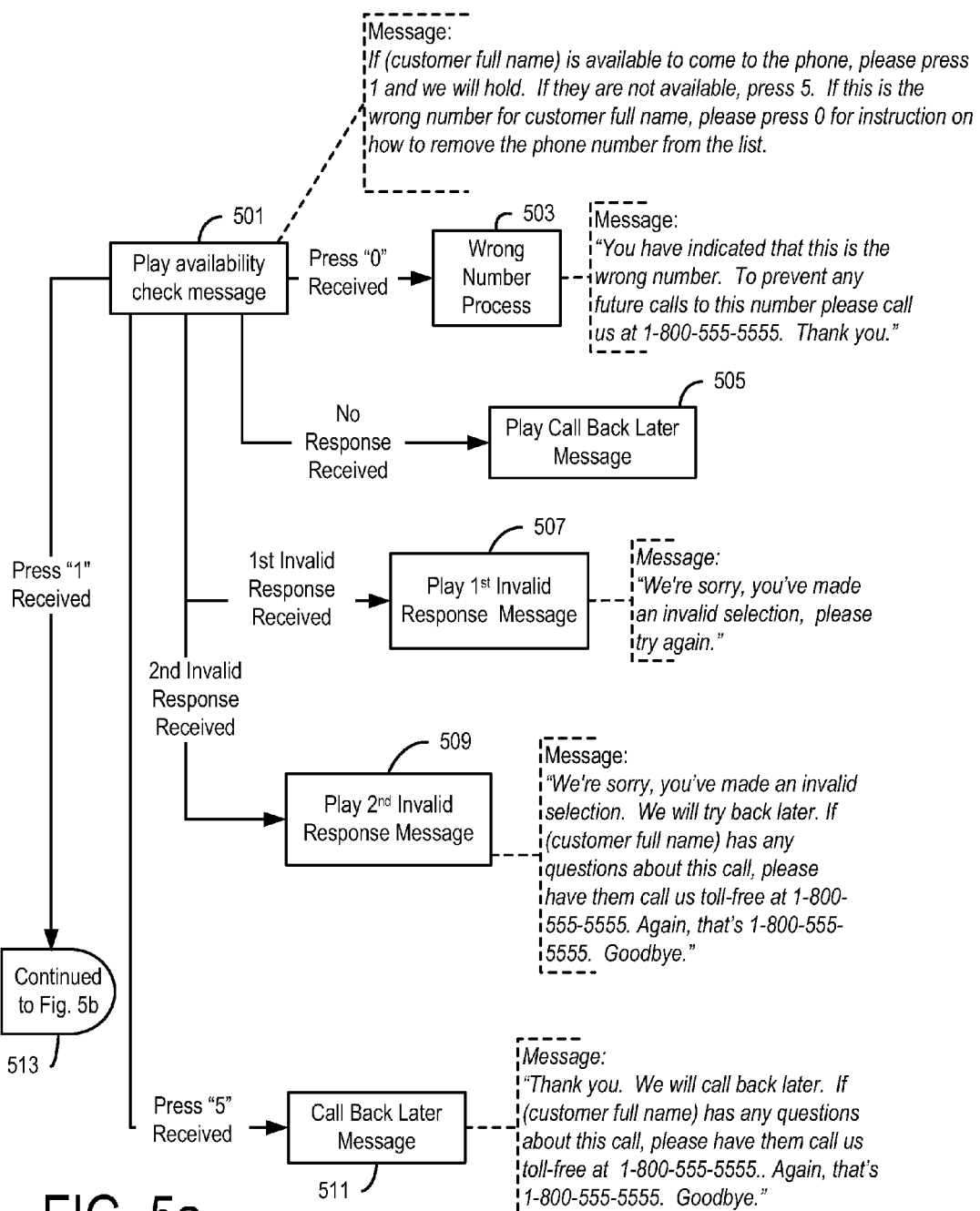
FIG. 5*a* is an example process that may be implemented using the system in FIG. 1 to check for availability.

Referring to FIG. 5a, at step 501, a message that may check the availability of the intended customer may be played by the speech signal generator 143. For example, the check availability message may state: "If (customer full name) is available to come to the phone, please press 1 and we will hold. If they are not available, press 5. If this is the wrong number for customer full name, please press 0 for instruction on how to remove the phone number from the list."

After step 501, if the person on the phone enters "0" (which in this example embodiment, indicates that the phone number being called is the wrong number for the intended customer), then at step 503, the wrong number process is entered. The wrong number process plays a message that recites: "You have indicated that this is the wrong number. To prevent any future calls to this number please call us at 1-800-555-5555. Thank you." Subsequently, the customer may call the banking institution. If no response is received from the person on the phone then, at step 505, a call back message may be played. The call back message may be similar to the call back message described above with regard to FIG. 4.

Next, if the person on the call enters an invalid response, then at step 507 a first invalid response message is played. For example, the first invalid response message may be similar to the first invalid response message discussed above in connection with FIG. 4. In other embodiments, other similar messages may be played for the first invalid response. After step 507, if the person on the call enters a second invalid response, then at step 509 a second invalid response message is played. Again, the second invalid response message may be similar to the second invalid response message discussed above in connection with FIG. 4. In other embodiments, other similar messages may be played for the second invalid response.

If the person presses 5 in response to the availability check message (indicating that the customer is not available to come to the telephone), then at step 511 a call back later message similar to the call back later message discussed above may be played. If the person on the call presses 1 (indicating that the customer is available to come to the telephone), then at step 511 the automated calling logic 140 places the call on hold. The process then proceeds to step 550, shown in FIG. 5b.

Figure 5B:
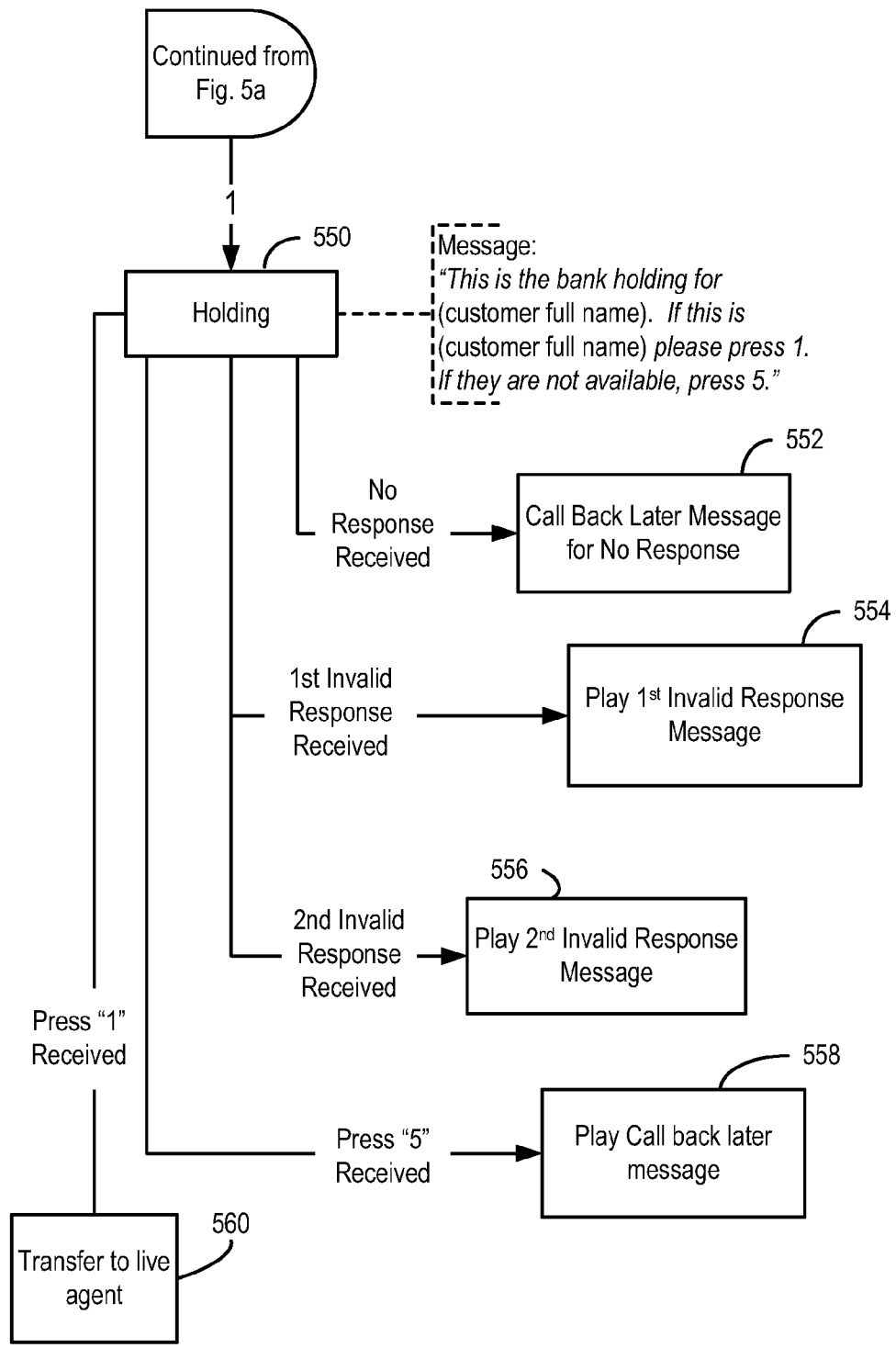
FIG. 5*b* is a method that may be implemented using the system in FIG. 1 when holding a call upon receiving an appropriate response from the process in FIG. 5*a*.

Referring to FIG. 5b, at step 550, the automated calling logic waits for the customer to come to the phone. While holding for the customer to get on the phone, the speech signal generator 143 may repeatedly play a message such as: "This is banking institution holding for (customer full name). If this is (the customer full name), please press 1. If they are not available, press 5." Once this message is repeated a predetermined number of times and no response has been detected by the determining logic 145, the call back later message may be played at step 552. For example, the call back later message at step 552 may be similar to the call back later message in FIGS. 4 and 5a.

If a number "1" is received while holding at step 550 (indicating that the customer has come to the telephone), then the call may be transferred to an agent using the call router 149. If an invalid response is received, then at step 554, the first invalid response received message is played that recites: "We're sorry, you've made an invalid selection, please try again." Upon receiving a second invalid response at step 556, a second invalid response received message is played that recites: "We're sorry, you've made an invalid selection, please try again." If a "5" is received as input from the person on the call (indicating that the customer is not available), then a call back message is played at step 558.

Each time any of these messages are played and a phone call is terminated the call log 134 in the data storage system 130 is updated. In other embodiments, the information in the call log 134 may be used by the automated calling logic to customize the messages that are played to remind the recipient of the phone call that this is the $4^{th}$, the $5^{th}$, $6^{th}$ or the so on phone call. It may also be noted that, while FIGS. 2-5b have described various messages, different messages and sequences of messages may also be used.

In addition to calling the customer regarding the adverse account status, the automated calling system 105 may be configured to play additional messages to the customer (including additional menu options) to resolve the condition causing the adverse account status without talking to a live agent. For example, if the adverse account status is a delinquent payment, the automated calling system 105 may play a message inquiring whether the customer would like to resolve the condition by making a payment from an account and providing appropriate set of menu options (e.g., "Press 1 for Yes. Press 2 for No."). Assuming the customer answers affirmatively, the automated calling system 105 may then play a message providing an appropriate set of menu options for selecting an account from which to make the payment (e.g., "Press 1 for your account having account number (acct#1). Press 2 for your account having account number (acct#2)."). Finally, if appropriate, the customer may be prompted to confirm a payment amount (e.g., where the payment amount is the same every month, "Press 1 for Yes. Press 2 for No.") or to manually enter an amount using the telephone keypad. The foregoing arrangement may also be used where the customer is overdrawn on a checking account (and the "payment" above is a funds transfer to the overdrawn checking account from another account). The foregoing arrangement may also be used where the customer has a credit card over a credit limit (and the "payment" above is a funds transfer to pay down the balance on the credit card). The settlement options may include among other things, identifying other accounts that are not in default which have funds that may be transferred to the account in default. The customer may also be given the option (and appropriate set of menu selections) to make the payment on a future date. The customer may also be presented with a settlement amount that is less than the amount in default. The customer may also be presented with a payment plan to the account holder. Again, before being provided such options, the customer may be authenticated in the manner described above, or using multi-factor authentication (e.g., entering pin numbers and correctly responding to security questions), as described above.

In other embodiments, one or more of account management logic 110, network interface logic 120, automated calling logic 140, and a data storage system 130 may be part of a different enterprise computing system (e.g., for a different enterprise) or may be located in a different location than other ones of the logic 110-140. Each of the various components and subcomponents of the enterprise computing system 105 is shown as being implemented as a single integrated computer system using appropriate software. However, in other embodiments, combinations of dedicated or specialized computing systems may also be used.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method for communicating with a customer via a telephone call, comprising:
    selecting the customer to call from a customer database to remediate an adverse account condition of a first account;
    initiating the telephone call using an automated calling system, the automated calling system including a speech signal generator configured to electronically generate a speech signal for transmission to the customer over a telephone network during the telephone call;
    determining whether a person that answered the telephone call is the customer based on an answer received from the customer after asking a security question, including:
    prompting the person to indicate whether the person is the customer, the prompting being performed by the speech signal generator,
    receiving input from the person responsive to the prompting, the input indicating whether the person is the customer;
    if the person that answered the telephone call is not the customer, then proceeding with the telephone call without transferring the telephone call to a human agent and the speech signal generator configured to electronically generate a speech signal for the person that answered the telephone call; and
    if the person that answered the telephone call is the customer determined by receiving a correct answer to the security question, then transferring the telephone call to the human agent, determining an amount of funds in a second account held by the customer and generating a settlement option to transfer funds from the second account, based on the determining that the second account has sufficient funds, to remediate the adverse account condition of the first account.

2. The method of claim 1, wherein prompting the person to indicate whether the person is the customer comprising asking the customer whether the person is the customer, the asking being performed by the speech signal generated by the speech signal generator.

3. The method of claim 1, wherein receiving input from the person responsive to the prompting comprises receiving a telephone keypad input from the customer.

4. The method of claim 1, wherein receiving input from the person responsive to the prompting comprises receiving a voice input from the customer.

5. The method of claim 1, further comprising selecting the customer to be called prior to initiating the telephone call, and wherein the customer is selected to be called based on the customer having an account with an adverse account condition.

6. The method of claim 5, wherein the customer is a customer of a banking institution, and wherein the account is an account the customer holds with the banking institution.

7. The method of claim 1,
    wherein prompting the person includes requesting keypad input from the customer,
    wherein the method further comprises assessing validity of a response based on a received keypad input, and
    wherein, upon receiving an invalid response, the automated calling system is adapted to play a prerecorded message requesting another attempt to input the customer identifying information.

8. A method for processing a telephone call, comprising:
    selecting a customer that is an account holder to call from a customer database to remediate an adverse account condition of a first account;
    initiating the telephone call to the account holder of a banking institution in response to the account holder having at least one account with an adverse account status using a computer implemented system;
    determining whether the telephone call has been answered by a live voice or an answering machine;
    requesting customer identifying information by asking a security questions to the account holder to authenticate in a case where a live voice is detected and in the case where the live voice belongs to the account holder, wherein authenticating includes receiving, key pad input that correctly answers the security question, from the account holder;
    transferring the telephone call to a banking institution live agent in a case where a live voice was detected, upon successful authentication and determining an amount of funds in a second account held by the customer and generating a settlement option to transfer funds from the second account, based on the determining that the second account has sufficient funds, to remediate the adverse account condition of the first account;
    generating a speech signal for a person with the live voice that answered the telephone call in the case where the live voice is not the account holder; and
    displaying account information to a live agent in a case where a live voice belongs to the account holder.

9. The method of claim 8, further comprising:
    identifying whether the telephone call was answered by the answering machine, and
    playing a voice file to be recorded as a message on the answering machine, wherein the message provides a phone number to call back.

10. The method of claim 9, wherein the default account condition comprises at least one of a payment delinquency, a checking account being overdrawn, or a credit card being over a credit limit.

11. The method of claim 9, wherein authenticating includes verifying whether the response is valid, and upon receiving an invalid response, a prerecorded message requests another attempt to input the customer identifying information.

12. The method of claim 9, further comprising identifying whether the telephone call was answered by the answering machine, and playing a voice file to be recorded as a message on the answering machine, wherein the message provides a phone number for the customer to call.

13. A computer-implemented system for communicating with a banking institution customer, comprising:
    an automatic dialer adapted to dial banking institution customer's phone number from a customer database; the automatic dialer configured to select a customer to call to remediate an adverse account condition of a first account;
    determining logic to determine whether a connected call is answered by a person or an answering machine;
    authentication logic configured to authenticate the customer based on a correct answer being received to a security question during the connected call and determining an amount of funds in a second account held by the customer and generating a settlement option to transfer funds from the second account, based on the determining that the second account has sufficient funds, to remediate the adverse account condition of the first account;
    in the case where the person that answered the connected call is not a customer generating a call back message for the person that answered the connected call;

a call router that routes the connected call based on input received from the determining logic and the authentication logic; and wherein the automatic dialer, the determining logic, the authentication logic, and the call router are implemented in machine-readable media having instructions stored therein and a machine that executes the instructions.

14. The system of claim 13, wherein the authentication logic is adapted to authenticate the customer based on a telephone keypad input received during the connected call.

15. The system of claim 13, wherein the authentication logic is adapted to authenticate the customer using voice recognition of a voice signal received during the connected call.

16. The system of claim 13, wherein the automatic dialer dials the customer responsive to the customer having an account with the banking institution that has an adverse account condition.

17. A method for processing a telephone call, comprising:
selecting a customer that is an account holder to call from a customer database;
initiating the telephone call to the account holder of a banking institution in response to the account holder having at least one account having an adverse account status using a computer implemented system, the adverse account status comprising at least one of, a payment delinquency, a checking account being overdrawn, or a credit card being over the credit limit;
determining that the telephone call has been answered by a person with a live voice;
requesting customer identifying information to authenticate that the live voice belongs to the customer, wherein authenticating includes asking a security question and receiving key pad input from the person that answered the telephone call, wherein authenticating includes verifying whether the response is a correct answer to the security question, and upon receiving an invalid response, an automated calling system is adapted to play a prerecorded message requesting an answer to another security question;
transferring the telephone call to a banking institution live agent upon successful authentication in the case where the live voice was the account holder, determining an amount of funds in a second account held by the customer and generating a settlement option to transfer funds from the second account, based on the determining that the second account has sufficient funds, to remediate the adverse account condition of the at least one account;
generating a speech signal for the person that answered the telephone call in the case where the live voice is not the account holder; and
displaying customer account information to the bank institution live agent, the account information including an amount by which the at least one account is in default in the case where the live voice belongs to the customer.

18. A computer-implemented method for communicating with a customer via a telephone call, comprising:
selecting a customer to be called from a customer database, the customer being selected to be called based on the customer having a first account with an adverse account condition;
initiating the telephone call using an automated calling system, the automated calling system including a speech signal generator configured to electronically generate a speech signal for transmission to the customer over a telephone network during the telephone call;
determining whether a person that answered the telephone call is the customer, including:
prompting the person to indicate whether the person is the customer, the prompting being performed by the speech signal generator,
receiving input from the person responsive to the prompting, the input indicating whether the person is the customer or not the customer;
prompting the person to answer a security question;
responsive to receiving a correct answer to the security question transferring the customer to an agent; and
providing the customer with options in the case where the person is the customer for resolving the adverse account condition, wherein the options include:
1) determining an amount of funds in a second account held by the customer;
generating a settlement option to transfer funds from the second account, based on the determining that the second account has sufficient funds, to remediate the adverse account condition of the first account; and
2) offering the customer a settlement amount, less than a full balance of the account with the adverse account status, allowing the customer to transfer funds from the other customer owned accounts to the account with the adverse account status equal to the settlement amount;
3) receiving a customer selection of at least one of the provided options; and
4) transferring the funds according to the selected option;
generating a speech signal for the person that answered the telephone call in the case where the person is not the customer.

19. The method of claim 1, further comprising:
accessing the second account of the customer and determining an account balance of the second account;
generating one or more options to remediate the adverse account condition of the first account based on the account balance in the second account; and
allowing the customer to transfer funds from the second account to the first account to remediate the adverse account status.

* * * * *